(12) United States Patent
Griffin et al.

(10) Patent No.: US 12,164,900 B2
(45) Date of Patent: Dec. 10, 2024

(54) HYBRID CLOUD PACKAGE BUILD ARCHITECTURE

(71) Applicant: Red Hat, Inc., Raleigh, NC (US)

(72) Inventors: Leigh Griffin, Waterford (IE); Leonardo Rossetti, Sao Paulo (BR)

(73) Assignee: Red Hat, Inc., Raleigh, NC (US)

( * ) Notice: Subject to any disclaimer, the term of this patent is extended or adjusted under 35 U.S.C. 154(b) by 39 days.

(21) Appl. No.: 17/876,192

(22) Filed: Jul. 28, 2022

(65) Prior Publication Data

US 2024/0036851 A1 Feb. 1, 2024

(51) Int. Cl.
*G06F 9/44* (2018.01)
*G06F 8/65* (2018.01)
*G06F 12/0868* (2016.01)
*G06N 20/00* (2019.01)

(52) U.S. Cl.
CPC ............ *G06F 8/65* (2013.01); *G06F 12/0868* (2013.01); *G06N 20/00* (2019.01)

(58) Field of Classification Search
CPC ....................................................... G06F 8/65
USPC ........................................................ 717/168
See application file for complete search history.

(56) References Cited

U.S. PATENT DOCUMENTS

| | | | |
|---|---|---|---|
| 8,949,788 B2 | 2/2015 | Bonnet | |
| 9,063,818 B1 * | 6/2015 | Risbood | G06N 20/00 |
| 9,489,188 B1 | 11/2016 | Guo et al. | |
| 9,582,261 B2 * | 2/2017 | Singh | G06F 3/04847 |
| 10,078,536 B2 | 9/2018 | Jubran et al. | |
| 10,409,583 B2 * | 9/2019 | Sreenivasa | G06F 9/547 |
| 10,411,975 B2 | 9/2019 | Martinez et al. | |
| 10,810,003 B2 * | 10/2020 | Gainsborough | G06F 8/65 |
| 11,109,339 B2 * | 8/2021 | Beattie, Jr. | H04W 60/04 |
| 11,188,354 B1 * | 11/2021 | Yu | G06F 9/44521 |
| 2004/0015831 A1 | 1/2004 | Bowhill | |
| 2018/0210712 A1 * | 7/2018 | Busjaeger | G06F 8/70 |
| 2020/0241867 A1 * | 7/2020 | Gainsborough | G06F 8/63 |
| 2021/0042108 A1 | 2/2021 | Suarez et al. | |
| 2023/0195596 A1 * | 6/2023 | Mazumdar | G06F 11/3612 |
| | | | 717/131 |
| 2023/0244466 A1 * | 8/2023 | Shah | G06F 8/71 |
| | | | 717/178 |

OTHER PUBLICATIONS

Author Unknown, "Creating and Managing Build Trigger," cloud.google.com/build/docs/automating-builds/create-manage-triggers, 2007, 10 pages.
Author Unknown, "About the Build System," docs.ros.org/en/foxy/Concepts/About-Build-System.html, Apr. 2022, 4 pages.

* cited by examiner

*Primary Examiner* — Evral E Bodden
(74) *Attorney, Agent, or Firm* — Dority & Manning, P.A.

(57) ABSTRACT

A hybrid cloud package build architecture can be provided for a computer system. For instance, a trigger can be determined for fetching an external package component for integration with a local package component. Based on the trigger, a request can be transmitted to an external package repository to obtain the external package component. The external package component can be received responsive to the request. The external package component can be cached for integration with the local package component.

20 Claims, 4 Drawing Sheets

HYBRID CLOUD PACKAGE BUILD ARCHITECTURE

BACKGROUND

Container orchestration systems automate the deployment, scaling, and management of containerized applications among nodes in a cluster. Some applications can build packages (e.g., data packages, software packages, etc.) from packaged components.

SUMMARY

The examples disclosed herein provide for implementing a hybrid cloud package build architecture. In some examples, a local computer system can build packages that have some local dependencies and some dependencies obtained from an external repository. The external dependencies can include external package components that can be updated and deprecated over time. In some example implementations, the external package components can be fetched from the external repository as needed (or as expected to be needed), and a local cache can be automatically maintained to mirror package versioning in the external repository. In this manner, for example, a hybrid architecture can facilitate integration of local package components with up-to-date external package components fetched from an external repository.

In one example a method is provided. The example method includes determining, by a computer system including one or more processor devices, a trigger for fetching an external package component for integration with a local package component. The example method includes transmitting, by the computer system and based on the trigger, a request to an external package repository to obtain the external package component. The example method includes receiving, by the computer system and responsive to the request, the external package component. The example method includes caching, by the computer system, the external package component for integration with the local package component.

In another example, a computing device is provided. The example computing device includes a memory and a processor device coupled to the memory to determine a trigger for fetching an external package component for integration with a local package component. The example computing device includes the processor device coupled to the memory to transmit, based on the trigger, a request to an external package repository to obtain the external package component. The example computing device includes the processor device coupled to the memory to receive, responsive to the request, the external package component. The example computing device includes the processor device coupled to the memory to cache the external package component for integration with the local package component.

In another example a non-transitory computer-readable storage medium is provided. The example non-transitory computer-readable storage medium includes executable instructions to cause one or more processor devices of one or more computing devices to determine a trigger for fetching an external package component for integration with a local package component. The instructions cause the processor device to transmit, based on the trigger, a request to an external package repository to obtain the external package component. The instructions cause the processor device to receive, responsive to the request, the external package component. The instructions cause the processor device to cache the external package component for integration with the local package component.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
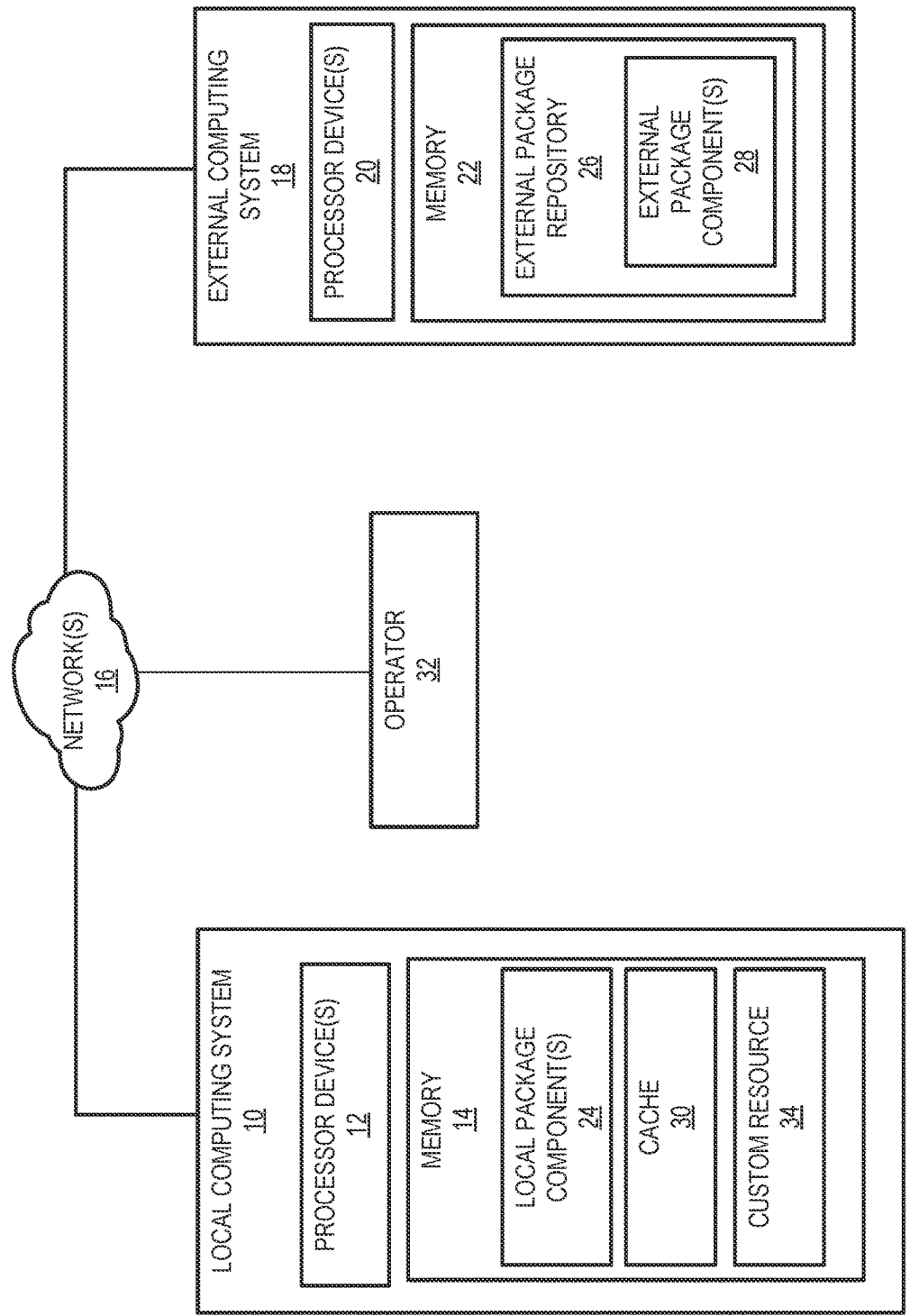
FIG. 1 is a block diagram of a runtime environment in which examples of a hybrid package build architecture according to example aspects of the present disclosure can be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context.

In some examples, software packages can be developed to have dependencies on packaged components. For instance, software packages can be built for deployment or distribution by combining or integrating a number of package components. Some packages can include off-the-shelf components. Traditionally, off-the-shelf components would need to be manually retrieved for building a package with other components. For instance, in some prior techniques, a local copy of an external repository could be manually constructed for access when building packages using local and external packages. But the external repository can be updated over time, rendering such a local copy out-of-date. For instance, external package components can be updated to new versions or deprecated and pulled from distribution. This generally presents a challenge for an administrator of the local copy to both know what is out of date and obtain the up-to-date package components (and any requisite further dependencies).

Advantageously, example implementations according to the present disclosure can provide for implementing a hybrid package build architecture that automatically manages retrieval of external package components for integration with local package components. As an example, implementations can determine a trigger for fetching an external package component for integration with a local package component (e.g., for building a software package). Based on the trigger, implementations can transmit a request to an external repository to obtain the external package component. Responsive to the request, implementations can receive the external package component. Implementations can cache the external package component for integration with the local package component, and optionally for future use for future build tasks. In this manner, for example, the package build architecture can interface with external package sources (e.g., external package build architectures) to leverage the external resources and minimizing unnecessary duplicative build tasks.

Example implementations are discussed herein in more detail with reference to the Figures by way of example only for the purposes of illustration.

FIG. 1 is a block diagram of an environment suitable for implementing an example optimization of a pipeline of services according to example implementations of the present disclosure. A local computing system can include processor device 12 and memory 14. In some implementations, the local computing system 10 may be a computing system that includes multiple computing devices. Alternatively, in some implementations, the local computing system 10 may be one or more computing devices within a computing system that includes multiple computing devices. Alternatively, the local computing system 10 can be implemented using shared resources of a computing device (e.g., processor device 12 and memory 14 being shared with one or more other systems, applications, processes, etc.).

As used herein, "local" can indicate an instantiation of a system or process under control, management, or access by a party associated with the system or process. For instance, "local" can indicate, but is not necessarily limited to, an on-premises instantiation of the system of process. For instance, "local" can indicate a cloud instantiation of the system or process.

In some implementations, the local computing system 10 can be implemented by a deployed application in a containerized environment. The processor device 12 may include any computing or electronic device capable of executing software instructions to implement the functionality described herein. The memory 14 can be or otherwise include any device(s) capable of storing data, including, but not limited to, volatile memory (random access memory, etc.), non-volatile memory, storage device(s) (e.g., hard drive(s), solid state drive(s), etc.).

The local computing system 10 can communicate with one or more additional computing systems via a network 16. For example, the source computing system can communicate with an external computing system 18. The external computing system 18 can include processor device(s) 20 and memory 22. In some implementations, the external computing system 18 may be a computing system that includes multiple computing devices. Alternatively, in some implementations, the external computing system 18 may be one or more computing devices within a computing system that includes multiple computing devices. Alternatively, the external computing system 18 can be implemented using shared resources of a computing device (e.g., processor device(s) 20 and memory 22 being shared with one or more other systems, applications, processes, such as with local computing system 10, etc.). In some implementations, the external computing system 18 can be implemented by a deployed application in a containerized environment. The processor device(s) 20 may include any computing or electronic device capable of executing software instructions to implement the functionality described herein. The memory 22 can be or otherwise include any device(s) capable of storing data, including, but not limited to, volatile memory (random access memory, etc.), non-volatile memory, storage device(s) (e.g., hard drive(s), solid state drive(s), etc.).

In some implementations, a first party can manage or use the local computing system 10 for building first party software packages. For instance, the local computing system 10 can provide a package build architecture for the first party development pipeline. For instance, a custom package can be built from multiple different package components from multiple different sources. Some package components can be local package components, such as local package component 24 available on a local computing system 10 and developed by a first party for building a first party software package. For example, the first party can build first party software packages using local package component 24 stored in the memory 14. For instance, first party software packages can include applications developed by the first party.

In some examples, some package components can be external package components, such as package components available from an external repository on a remotely managed system and developed by a third party for distribution. For instance, external package components can provide building blocks for various software functionalities, such that first party local package components can be built with dependencies on third party building blocks.

For example, a third party can manage or use the external computing system 18 for hosting or distributing third-party software packages. For instance, the third party can expose an external package repository 26 to the network 16 for distribution of external package components 28. The external package components 28 can include software package components developed by the third party for providing various software functionalities and services. For instance, the external package components 28 can include building blocks of software functionality for combination with or integration into downstream software package builds.

To facilitate integration with local package components, example implementations of the present disclosure can provide for retrieving external package components 28 from the external package repository 26. For example, in some implementations, the local computing system 10 can fetch the external package component 28 for integration with the local package component 24.

In some examples, implementations can provide for automatic maintenance of a local cache of external package components from one or more external repository sources. For instance, in some examples, a just-in-time caching scheme can be implemented to obtain external package components on-demand. In some examples, a predictive caching scheme can be implemented to obtain external package components based on predicted use of the external package components. In this manner, for example, implementations according to aspects of the present disclosure can provide for maintenance of an up-to-date cache that updates, replaces, or removes package components based on corresponding changes in the external repository.

For instance, in some examples, fetched external package component 28 can be stored in a cache 30. For instance, the cache 30 can store fetched external package component 28 for present and future use in building packages by the local computing system 10.

In some examples, a computer system can maintain a local cache based on a trigger system. For instance, a computer system can determine a trigger based on a need for an external package component. In some examples, the computer system can determine the need based on a queued or scheduled package build. For instance, the computer system can determine the need based on a list of package components associated with a package build task. In this manner, for instance, some implementations can provide for just-in-time or on-demand fetching of up-to-date external package components for loading into the cache for use in the package build.

For example, in some implementations, the local computing system 10 can fetch the external package component 28 based on a trigger. For instance, the local computing system 10 can determine a trigger event or condition. Additionally, or alternatively, an operator 32 can determine a trigger event or condition. The operator 32 can be implemented as part of the local computing system 10, the external computing system 18, cooperatively between both, or on a different computing system. For instance, the operator 32 can be executed as part of a service that provides one or more repository management services for the local computing system 10 (e.g., for the first party).

In some implementations, a package build task being queued can trigger a process for obtaining any external package component 28 needed for the build task. For instance, the trigger can be based on configuration data associated with the package build task. For example, a custom resource 34 can be defined that sets out a policy for creating or maintaining the cache 30. The custom resource 34 can be a data structure containing definitions, instructions, links, network addresses, URLs, credentials, etc. The policy can include various rules for retrieving package components (e.g., update intervals, preferred hosts, versioning types, such as long term or nightly builds, etc.).

In some implementations, the custom resource 34 can identify one or more external package components 28 to be maintained in the cache 30. For instance, the custom resource 34 can be associated with a particular package build task, and the custom resource 34 can enumerate one or more external package components 28 to be used for that particular package build task. In some examples, the external package components 28 can be identified with a version number. In some examples, the external package components 28 can be identified without requiring a particular version number, such as by identifying the package by name, and optionally referencing the recency of the version (e.g., "request PackageName; version=MostRecent", etc.). In some examples, the custom resource 34 can specify backward compatibility, such as to obtain the most recent package versions except when the most recent package versions are not backward compatible (e.g., "request PackageName; version=MostRecent; compatibility_level=CompatibleWithVersionX", etc.).

In some implementations, a tagging system can identify external package components 28. For instance, external package components 28 can be tagged to associate the external package components 28 with a particular package build task. Based on the tag association, the external package components 28 can be obtained from the external package repository 26 or the cache 30 when the package build task is executed. Based on the tag association, the local computing system 10 can monitor the package component source (e.g., the external package repository 26) for any changes, and update the cache 30 accordingly.

In general, the custom resource 34 can contain instructions for directing a computer system (e.g., local computing system 10) to perform according to aspects of the present disclosure. For instance, the custom resource 34 can instruct the operator 32 to maintain the cache 30 in view of the external package repository 26 according to a desired policy.

In some implementations, a computer system can determine the need based on a projected or predicted use. For instance, usage data (e.g., log data) descriptive of external package component usage (e.g., collected over a period of time) can provide a basis for predicting future usage of external package components. For instance, a predictive model (e.g., a machine-learned predictive model) can predict future usage based on log data. In this manner, for instance, the computer system can prefetch external package components.

For instance, a predicted package build task can trigger a process for obtaining expected external package component 28 that are expected to be needed for a predicted build task. In another example, a prediction of likely needs for external package components 28 can trigger a process for obtaining the likely needed external package component 28 (e.g., separately from any predicted or scheduled build task). In another example, an interval of time (e.g., since the last cache update, the last update to a particular package component, etc.) can trigger a process for obtaining any updates to any packages stored in the cache 30.

Based on the trigger, the local computing system 10 or the operator 32 can transmit a request to the external computing system 18 to request the desired packages. In some examples, the request can be contemporaneously responsive to the trigger. In some examples, the request can be scheduled for some future time based on detecting the trigger at a first time. In some examples, the request can identify the desired package components with various levels of particularity. In some examples, the request can indicate a particular version or build of the package components. In some examples, the request can indicate a name of a package but allow the external computing system 18 to provide an updated version if available. For example, the request can indicate a list of packages and request any updates to the packages, if available.

In some implementations, the local computing system 10 can receive any fetched external package components (e.g., from the external computing system 18) and store them in the cache 30. In some examples, the cached external package components 28 can be used in multiple package build tasks, such as in subsequent package build tasks after a package build tasks that triggers an original request to retrieve or update the cached external package components 28. For instance, the external package components 28 can be used in a first build task for integrating the external package components 28 with a first local package component and later retrieved from the cache for a second build task for integrating the external package components 28 with a second local package component.

In some implementations, the local computing system 10 or the operator 32 can initiate updates to the cache 30. For example, the local computing system 10 or the operator 32 can monitor for any updates to packages in the cache 30. For example, the local computing system 10 or the operator 32 can monitor the cache 30 to ensure that package components in the cache 30 are maintained. For instance, if external package components 28 in the cache 30 are removed or altered, the local computing system 10 or the operator 32 can repair the cache 30 by fetching a clean copy of the external package components 28 from the external package repository 26. In some examples, the local computing system 10 or the operator 32 can monitor the external package repository 26 for any changes to any packages cached in the cache 30. For instance, the local computing system 10 or the operator 32 can request an accounting of current versions of a list of packages (e.g., a list of external package components 28 in the cache 30) and compare the versions in the external package repository 26 with the versions in the cache 30. Based on any differences, the local computing system 10 or the operator 32 can trigger obtaining the current versions for updating the cache 30.

In some implementations, the local computing system 10 can rebuild one or more downstream packages responsive to an update to the external package components 28 retrieved from the external package repository 26. For instance, the local computing system 10 can cause a rebuild of any packages with updated dependencies (e.g., updated based on a corresponding update to the external package repository 26).

In some implementations, the local computing system 10 can provide a local repository of external packages for use by the local computing system 10. For instance, the local repository can be organized by a tagging system that associates packages with build tasks based on a tag assigned to the packages. In some implementations, an external package component 28 can be associated with a tag, and the assignment of the tag can be a trigger as discussed herein for obtaining the external package component 28.

In some examples, the local repository can be implemented in a containerized environment. For instance, a package build architecture can be implemented as one or more containerized application(s). Optionally, the one or more containerized application(s) can collectively form the local computing system 10, even if the containerized application(s) are not physically localized together. In some examples, the package build architecture can be implemented as a pod of containerized application(s).

The term "containerized application" as used herein refers to an application that comprises one or more container images, and is initiated and managed via a container orchestration system. When executed, a container image is initiated as a Linux® container, wherein the Linux® kernel features cgroups and namespaces are used to isolate processes from one another. A container image is often created from a containerization technology, such as, by way of non-limiting example, Docker®, or the like. The term "container orchestration system" refers to a system that automates the deployment, scaling and management of containerized applications among nodes in a cluster. The Kubernetes® container orchestration system (Kubernetes.io) is one example of a container orchestration system. The term "resource" as used herein refers to any individual component managed by the container orchestration system for which, if requested, the container orchestration system will return information specific to the resource. In the Kubernetes® container orchestration system, each resource of an application is typically defined in a YAML Ain't Markup Language (YAML) file and has a "kind" attribute (sometimes referred to herein as "type") and a "name" attribute.

Some examples discussed herein are provided in the context of the Kubernetes® container orchestration system and using terminology used in the Kubernetes® container orchestration system; however, the examples are applicable to any container orchestration system capable of deploying, scaling, and managing containerized applications among nodes in a cluster. Container orchestration systems automate the deployment, scaling, and management of containerized applications among nodes in a cluster. A containerized application may include tens or hundreds of different containers and other resources, and each container or resource may have any number of instances distributed over many different nodes in a cluster. Increasingly, especially in conjunction with cloud computing environments, a containerized application may be distributed over many different nodes in several different clusters.

In some implementations, a containerized application can include a package build architecture. For instance, a package building software can be implemented in a containerized environment for deployment as a containerized application or in support of building containerized applications. In some examples, the package build architecture can include a central hub or server (e.g., in one container or containerized environment) that communicates with a number of workers (e.g., build nodes or daemons in the same container, in the same containerized environment, etc.). In this manner, for example, the central hub can optionally centralize database read or write access. In some examples, the package building software can be the Koji® package build software architecture, which can leverage koji-hub instances and use build daemons for building packages.

In some implementations, the local repository can be implemented in a containerized application such that it appears to and is accessible by other containers in a pod. In some examples, multiple repository instances can be set up and maintained (e.g., multiple instances of local computing system 10, multiple containers instantiated on one or more other systems, etc.). In some examples, the local repository can facilitate the retrieval of external package components 28 from the external computing system 18 such that the other containers in the pod need not be in communication with the external computing system 18. Additionally, or alternatively, in some examples, the local repository can facilitate the retrieval of external package components 28 from the external computing system 18 such that the other containers in the pod are not aware that the external package components 28 have been fetched externally instead of built locally.

In some examples, the containerized application can interact with or be instructed by an operator. For instance, an operator (e.g., an OpenShift operator) can instruct a central hub (e.g., koji-hub) to fetch updates from a particular external repository. In some examples, the instructions are based on the custom resource 34.

In some implementations, the operator 32 can be implemented by a native application in a containerized environment (e.g., a native application of a container orchestration system). For instance, the operator 32 can be a runtime executed by the container orchestration system to monitor and interact with containerized applications running thereon. In some examples, the operator 32 can be managed by a backplane providing lifecycle management of the operator 32, such as by overseeing installation, updates of, and control over the operator 32. In this manner, for instance, the operator 32 itself can be more resilient against downtime or error, because inadvertent editing of or deletion of the operator 32 can be resolved automatically by the backplane.

In some implementations, the operator 32 can manage one or more local repositories. For instance, the operator 32 can manage multiple instances of local repositories.

In some implementations, the custom resource 34 can instruct the local computing system 10 or the operator 32. For instance, the custom resource 34 can include an instruction file configured for instructing a container orchestration component, such as a container orchestration operator, to maintain a state of a container. For instance, in some implementations a container can implement a local cache forming a repository, and the operator (e.g., operator 32) can maintain a state of the local cache according to the instructions in the custom resource 34.

Various implementations according to the present disclosure can provide for a number of technical effects and benefits. For instance, example implementations can provide for improved system integrity and security. Relying on a manually created and maintained local cache of external package components can be error-prone. For instance, keeping up with the pace of development (e.g., for critical security patches, etc.) for a library of external package dependencies can be difficult if not impossible. Updates can be missed, leaving packages unpatched and possibly risking insecure deployments. In contrast, example implementations according to the present disclosure can provide for automatic techniques for monitoring a source of desired package components for updates and synchronizing and updating a local cache automatically based on any changes in the source repository. In this manner, for instance, the local cache can be made more reliable and provide for package builds that leverage up-to-date dependencies for improved system integrity and security.

In some examples, example implementations can provide for improved latency for up-to-date package build tasks. For instance, prior approaches to resolving the need for current package components include exclusively obtaining externally-hosted package components from the external source. But such an approach relies on numerous requests for the same content from the external repository, generating redundant network traffic and causing delays in the build time while the package component(s) are fetched. In contrast, automatically maintaining an up-to-date local cache resolves the challenges of tracking current versioning while also providing for improved latency for repeated use of the fetched package components.

In some examples, example implementations can facilitate improved firewall protection of sensitive local packages. For instance, some prior approaches to resolving the aforementioned challenges include using external build systems (e.g., external build systems integrated with an external repository, etc.). In contrast, however, the hybrid package build architecture of the present disclosure can prove for firewall rule enforcement to keep sensitive local package components (e.g., proprietary data, proprietary algorithms, etc.) from leaking out to the external build systems. In this manner, for instance, example implementations can facilitate improved firewall protection of sensitive local packages on computer systems.

In some examples, example implementations can provide for decreased computation cost associated with new software builds. For instance, in some prior techniques, incorporating or integrating external dependencies would require rebuilding of the packages for every update, or even a complete rebuilding of a package build software. In contrast, example implementations according to the present disclosure can advantageously avoid unnecessary rebuilding of packages by leveraging the external package components directly obtained from the external repository and already built by the third party system(s).

In some examples, example implementations can provide for increased speed of propagation of dependency updates through to a completed package build. For instance, by monitoring an external package repository for updates, and retrieving updates for external package components in a local cache, example implementations can automatically cause rebuilds of local package builds that include the updated external package components. In this manner, for instance, patches (e.g., security patches) can rapidly be propagated from an external source through to an output package build deployed in a local environment.

Figure 2:
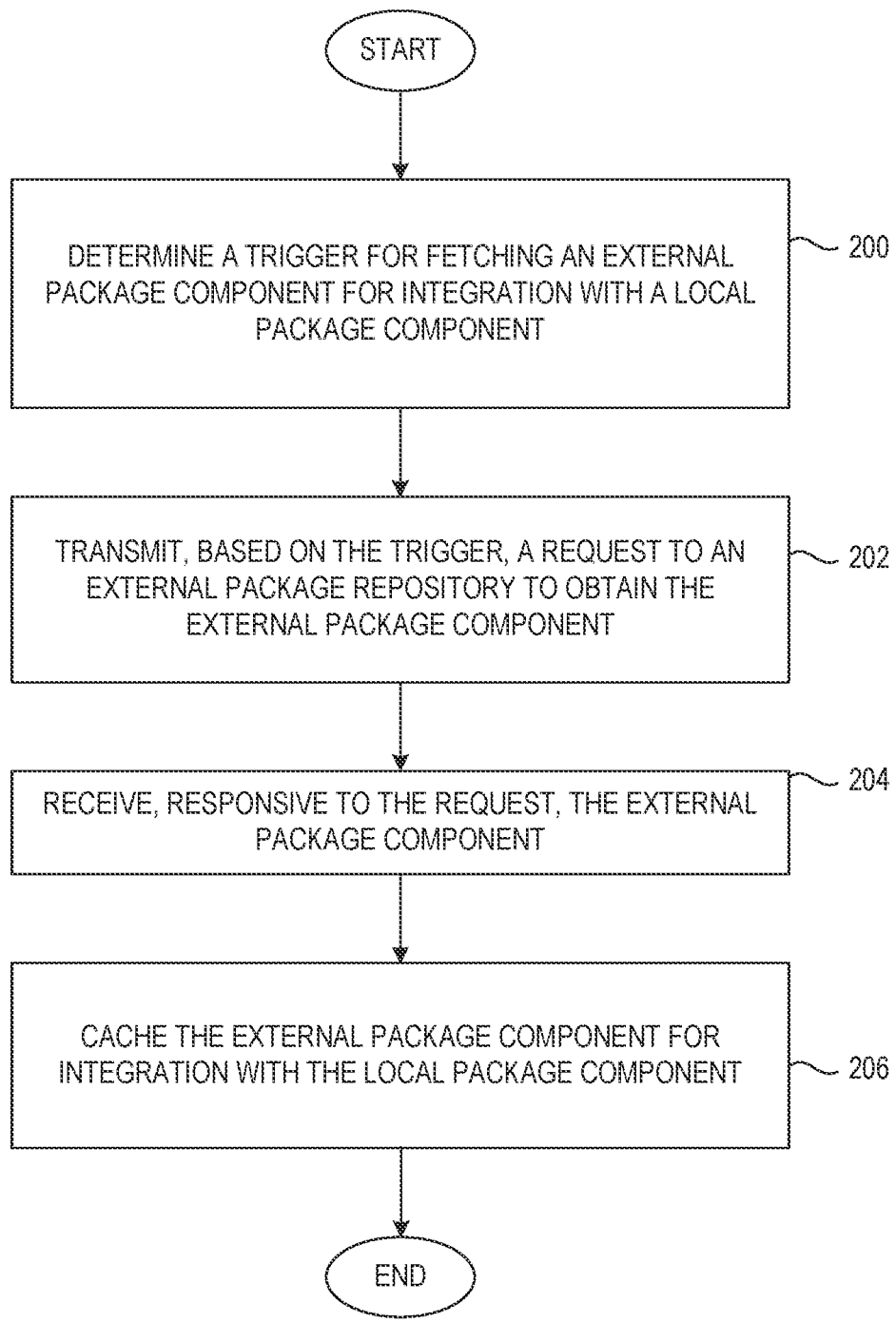
FIG. 2 is a flowchart of a method for implementing a hybrid package build architecture according to example aspects of the present disclosure according to one example.

FIG. 2 is a flowchart of a method for implementing a hybrid package build architecture according to example aspects of the present disclosure. FIG. 2 will be discussed in conjunction with FIG. 1.

At 200, a computing system (e.g., the local computing system 10, the operator 32, etc.) can determine a trigger for fetching an external package component for integration with a local package component. For instance, the external package component can be an external package component 28, and the local package component can be a local package component 24 of the local computing system 10.

At 202, the local computing system 10 or the operator 32 can transmit, based on the trigger, a request to an external package repository (e.g., external package repository 26) to obtain the external package component. The request can be transmitted, for example by way of network 16.

At 204, the local computing system 10 or the operator 32 can receive, responsive to the request, the external package component.

At 206, the local computing system 10 or the operator 32 can cache the external package component (e.g., in cache 30) for integration with the local package component.

In some implementations, the local computing system 10 or the operator 32 can retrieve, from a cache, the external package component for integration with a second local package component.

In some implementations, the local computing system 10 or the operator 32 can update the cached external package component based on an update to the external package repository.

In some implementations, the local computing system 10 or the operator 32 can instruct, using a custom resource associated with the local package component, an operator component to update the cached external package component.

In some implementations, the local computing system 10 or the operator 32 can generate the request based on one or more instructions indicated in the custom resource.

In some implementations, the local computing system 10 or the operator 32 can generate, using a machine-learned model configured to receive log data descriptive of external package component usage, an output indicating a likelihood of use for one or more external package components of the external package repository, and generate the request based on the output.

In some implementations, the local computing system 10 or the operator 32 can cache the external package component in a local repository hosted in a container of a containerized environment.

Figure 3:
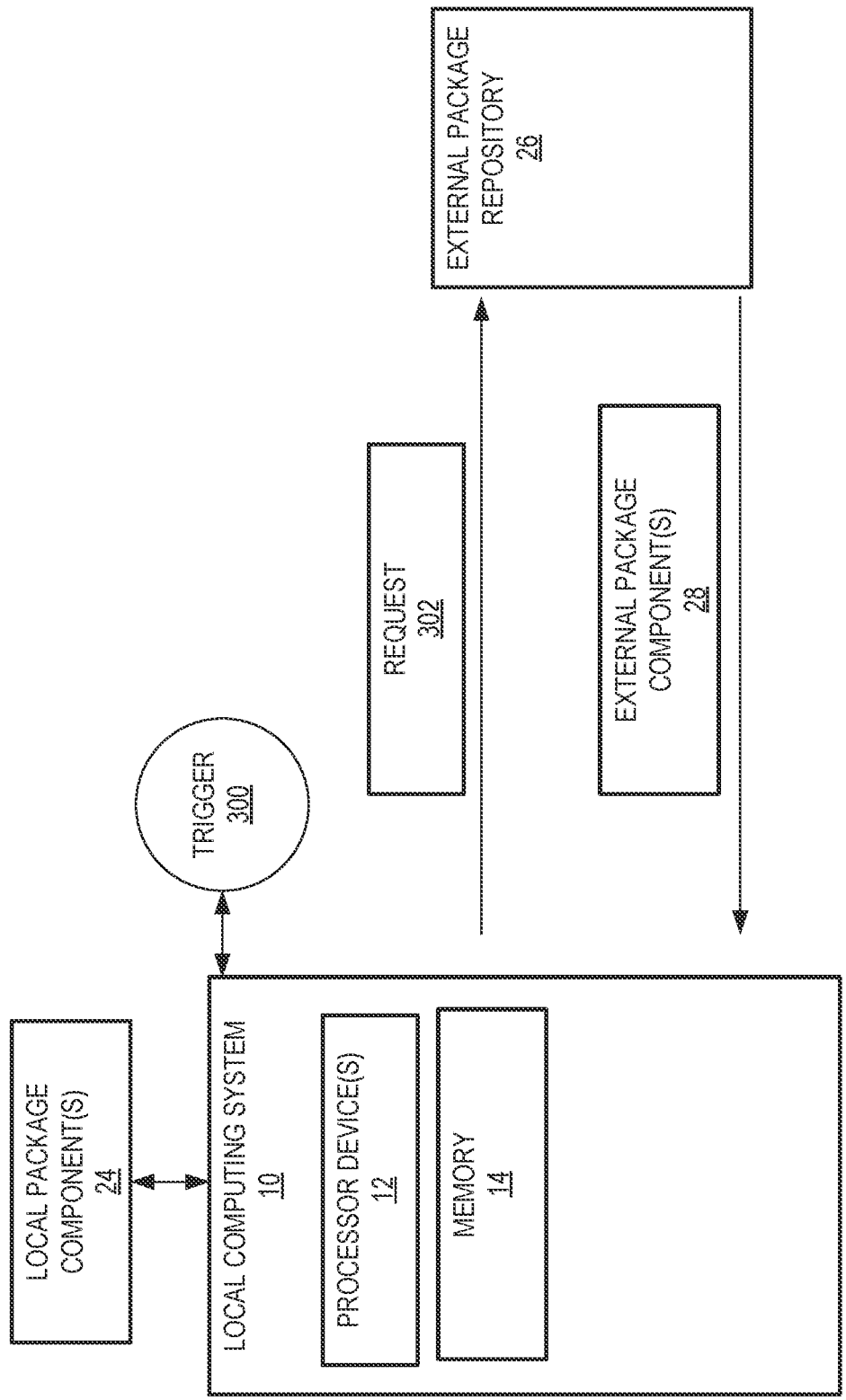
FIG. 3 is a simplified block diagram of the runtime environment illustrated in FIG. 1 according to one example.

FIG. 3 is a simplified block diagram of the environment illustrated in FIG. 1 according to one implementation. Local computing system 10 includes the processor device 12 and the memory 14. The processor device 12 is coupled to the memory 14. The processor device 12 is to determine a trigger 300 for fetching an external package component 28 for integration with a local package component 24. The processor device 12 is to transmit, based on the trigger 300, a request 302 to an external package repository to obtain the external package component 28. The processor device 12 is to receive, responsive to the request 302, the external package component 28. The processor device 12 is to cache the external package component 28 for integration with the local package component 24.

It is noted that while, for purposes of illustration and simplicity, the embodiments are illustrated as being implemented by computer system that comprises a single computing device that in turn comprises a single processor device, in practice the examples/embodiments disclosed herein may be implemented in a computer system that comprises any number of computing devices, each of which may comprise one or more processor devices. Thus, irrespective of the implementation, the examples/embodiments may be implemented on a computer system that includes one or more computing devices, wherein the one or more computing devices comprise one or more processor devices, and the one or more processor devices are configured to implement functionality disclosed herein.

Figure 4:
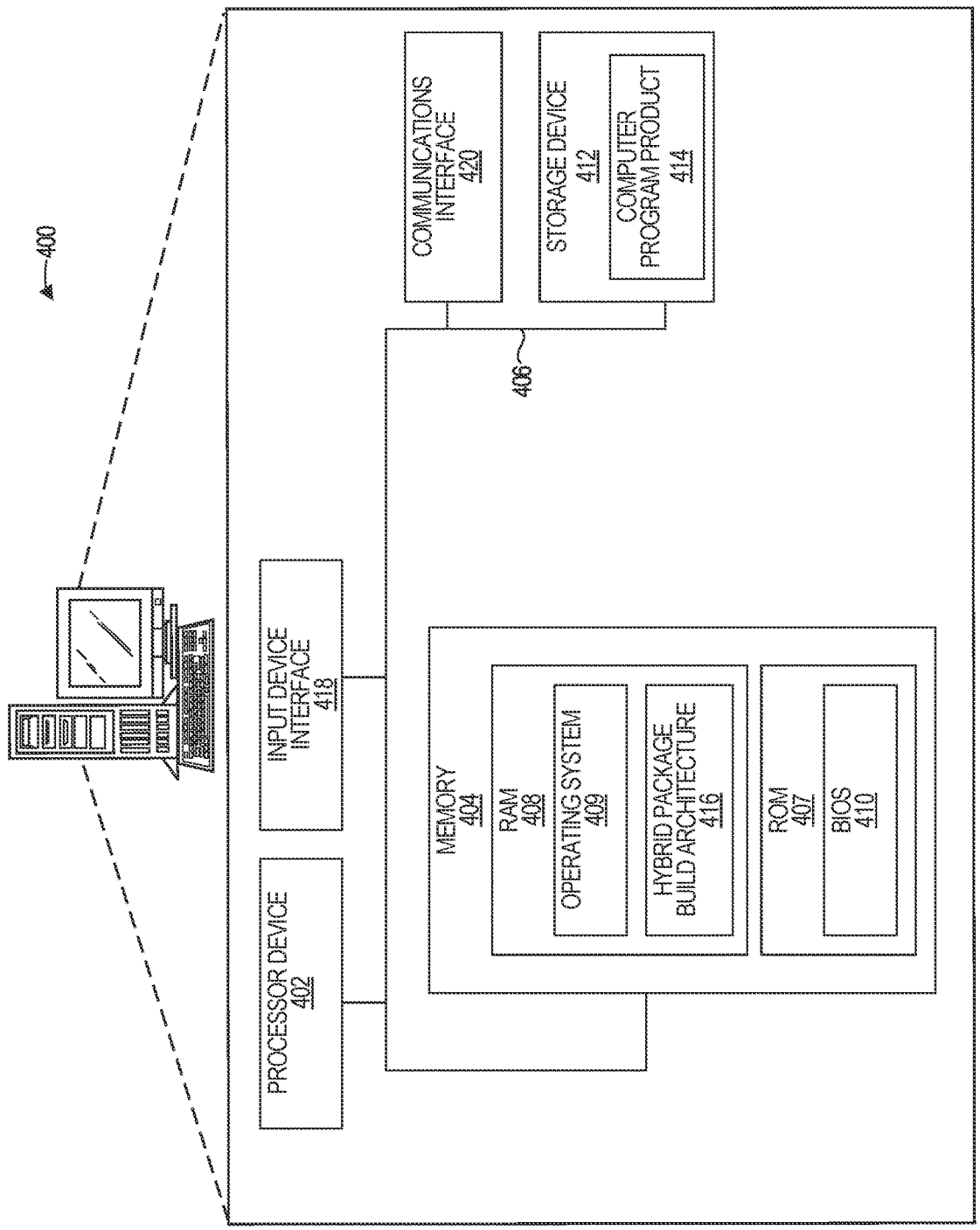
FIG. 4 is a block diagram of an example of a computing device illustrated in FIG. 1 suitable for implementing examples according to one example.

FIG. 4 is a block diagram of an example computing device (e.g., included in or implementing the local computing system 10) suitable for implementing examples according to one example. The computing device 400 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 400 includes the processor device 402, the system memory 404, and a system bus 406. The system bus 406 provides an interface for system components including, but not limited to, the system memory 404 and the processor device 402. The processor device 402 can be any commercially available or proprietary processor.

The system bus 406 may be any of several types of bus structures that may further interconnect to a memory bus (with or without a memory controller), a peripheral bus, and/or a local bus using any of a variety of commercially available bus architectures. The system memory 404 may include non-volatile memory 407 (e.g., read-only memory (ROM), erasable programmable read-only memory (EPROM), electrically erasable programmable read-only memory (EEPROM), etc.), and volatile memory 408 (e.g., random-access memory (RAM)). A basic input/output system (BIOS) 410 may be stored in the non-volatile memory 407 and can include the basic routines that help to transfer information between elements within the computing device 400. The volatile memory 408 may also include a high-speed RAM, such as static RAM, for caching data.

The computing device 400 may include or be coupled to a non-transitory computer-readable storage medium, such as the storage device 412, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 412 and other drives associated with computer-readable media and computer-usable media may provide non-volatile storage of data, data structures, computer-executable instructions, and the like.

A number of modules can be stored in the storage device 412 and in the volatile memory 408, including an operating system 409 and one or more program modules, such as the hybrid package build architecture of the present disclosure (e.g., the local computing system 10, operator 32, etc.), which may implement the functionality described herein in whole or in part. All or a portion of the examples may be implemented as a computer program product 414 stored on a transitory or non-transitory computer-usable or computer-readable storage medium, such as the storage device 412 which includes complex programming instructions, such as complex computer-readable program code, to cause the processor device 402 to carry out the steps described herein. Thus, the computer-readable program code can comprise software instructions for implementing the functionality of the examples described herein when executed on the processor device 402. The processor device 402, in conjunction with the instructions for the hybrid package build architecture 416 loaded in the volatile memory 408, may serve as a controller, or control system, for the computing device 400 that is to implement the functionality described herein.

A user may also be able to enter one or more configuration commands through a keyboard (not illustrated), a pointing device such as a mouse (not illustrated), or a touch-sensitive surface such as a display device. Such input devices may be connected to the processor device 402 through an input device interface 418 that is coupled to the system bus 406 but can be connected by other interfaces such as a parallel port, an Institute of Electrical and Electronic Engineers (IEEE) 1394 serial port, a Universal Serial Bus (USB) port, an IR interface, and the like.

The computing device 400 may also include the communications interface 420 suitable for communicating with the network 16 as appropriate or desired. The computing device 400 may also include a video port configured to interface with a display device to provide information to the user.

Individuals will recognize improvements and modifications to the preferred examples of the disclosure. All such improvements and modifications are considered within the scope of the concepts disclosed herein and the claims that follow.

What is claimed is:

1. A method, comprising:

transmitting, by a computer system comprising one or more processor devices and based on a trigger for fetching an external package component for integration with a local package component, a request to an external package repository to obtain the external package component;

receiving, by the computer system and responsive to the request, the external package component;

providing, by the computer system, the external package component to an application executing in a first container operated by a container orchestration system executing on the computer system;

caching, by an operator implemented in the container orchestration system executing on the computer system, in a local package repository executing in a second container operated by the container orchestration system, the external package component for integration with the local package component;

updating, by the operator and responsive to an update to the external package component on the external package repository, the external package component in the local package repository to generate an updated external package component; and providing, by the operator and from the local package repository, the updated external package component to the application executing in the first container for integration with a second local package component.

2. The method of claim 1, comprising:
responsive to updating the external package component:
rebuilding, by the computer system, the local package component with the updated external package component.

3. The method of claim 1, comprising:
instructing, by the computer system and using a custom resource associated with the local package component, the operator to update the external package component.

4. The method of claim 3, comprising:
generating, by the computer system, the request based on one or more instructions indicated in the custom resource.

5. The method of claim 1, comprising:
generating, by the computer system and using a machine-learned model configured to receive log data descriptive of external package component usage, an output indicating a likelihood of use for one or more external package components of the external package repository; and
generating, by the computer system, the request based on the output.

6. The method of claim 2, wherein the operator is configured to:
trigger the updating of the external package component based on a difference between:
a version of the external package component on the external package repository, and
a version of the external package component in the local package repository.

7. A computer system, comprising:
a memory; and
one or more processor devices coupled to the memory to:
transmit, based on a trigger for fetching an external package component for integration with a local package component, a request to an external package repository to obtain the external package component;
receive, responsive to the request, the external package component;
provide the external package component to an application executing in a first container operated by a container orchestration system executing on the computer system;
cache, by an operator implemented in the container orchestration system executing on the computer system, in a local package repository, the external package component for integration with the local package component;
update, by the operator and responsive to an update to the external package component on the external package repository, the external package component in the local package repository to generate an updated external package component; and
provide, by the operator and from the local package repository, the updated external package component to the application executing in the first container for integration with a second local package component.

8. The system of claim 7, comprising the one or more processor devices coupled to the memory to:
responsive to updating the external package component: rebuild the local package component with the updated external package component.

9. The system of claim 7, comprising the one or more processor devices coupled to the memory to:
instruct, using a custom resource associated with the local package component, the operator to update the external package component.

10. The system of claim 7, comprising the one or more processor devices coupled to the memory to:
generate, using a machine-learned model configured to receive log data descriptive of external package component usage, an output indicating a likelihood of use for one or more external package components of the external package repository; and
generate the request based on the output.

11. The system of claim 8, wherein the operator is configured to:
trigger the updating of the external package component based on a difference between:
a version of the external package component on the external package repository, and
a version of the external package component in the local package repository.

12. A non-transitory computer-readable storage medium that includes executable instructions to cause one or more processor devices of one or more computing devices to:
transmit, based on a trigger for fetching an external package component for integration with a local package component, a request to an external package repository to obtain the external package component;
receive, responsive to the request, the external package component;
provide the external package component to an application executing in a first container operated by a container orchestration system executing on the one or more computing devices;
cache, by an operator implemented in the container orchestration system executing on the one or more computing devices, in a local package repository, the external package component for integration with the local package component;
update, by the operator and responsive to an update to the external package component on the external package repository, the external package component in the local package repository to generate an updated external package component; and
provide, by the operator and from the local package repository, the updated external package component to the application executing in the first container for integration with a second local package component.

13. The non-transitory computer-readable storage medium of claim 12, wherein the instructions further cause the one or more processor devices to:
responsive to updating the external package component: rebuild the local package component with the updated external package component.

14. The non-transitory computer-readable storage medium of claim 12, wherein the instructions further cause the one or more processor devices to:
instruct, using a custom resource associated with the local package component, the operator to update the external package component.

15. The non-transitory computer-readable storage medium of claim 14, wherein the instructions further cause the one or more processor devices to:
generate the request based on one or more instructions indicated in the custom resource.

16. The non-transitory computer-readable storage medium of claim 12, wherein the instructions further cause the one or more processor devices to:
  generate, using a machine-learned model configured to receive log data descriptive of external package component usage, an output indicating a likelihood of use for one or more external package components of the external package repository; and
  generate the request based on the output.

17. The non-transitory computer-readable storage medium of claim 13, wherein the operator is configured to:
  trigger the updating of the external package component based on a difference between:
    a version of the external package component on the external package repository, and
    a version of the external package component in the local package repository.

18. The method of claim 1, wherein the application comprises a queue comprising a package build task, wherein the trigger is based on the package build task.

19. The method of claim 3, wherein the custom resource defines a policy for caching packages in the local package repository.

20. The method of claim 19, wherein the custom resource enumerates one or more external package components to be used for a package build task.

* * * * *